United States Patent
Schaeffer et al.

(10) Patent No.: US 11,156,106 B2
(45) Date of Patent: Oct. 26, 2021

(54) CONTROLLING EXTENT OF TBC SHEET SPALL

(71) Applicant: General Electric Company, Schenectady, NY (US)

(72) Inventors: Jon Conrad Schaeffer, Greenville, SC (US); David Vincent Bucci, Simpsonville, SC (US); Canan Uslu Hardwicke, Greenville, SC (US); Srikanth Chandrudu Kottilingam, Greenville, SC (US); Kathleen Blanche Morey, Anderson, SC (US); Lacey Lynn Schwab, Greenville, SC (US)

(73) Assignee: General Electric Company, Schenectady, NY (US)

( * ) Notice: Subject to any disclaimer, the term of this patent is extended or adjusted under 35 U.S.C. 154(b) by 273 days.

(21) Appl. No.: 16/271,978

(22) Filed: Feb. 11, 2019

(65) Prior Publication Data
US 2020/0256201 A1  Aug. 13, 2020

(51) Int. Cl.
*F01D 5/28* (2006.01)
*F01D 11/12* (2006.01)
(Continued)

(52) U.S. Cl.
CPC .............. *F01D 5/288* (2013.01); *B05D 3/00* (2013.01); *F01D 11/122* (2013.01); *C23C 4/02* (2013.01);
(Continued)

(58) Field of Classification Search
CPC ......... F01D 5/288; F01D 11/122; B05D 3/00; F05D 2230/10; F05D 2230/22;
(Continued)

(56) References Cited

U.S. PATENT DOCUMENTS 5,558,922 A    9/1996  Gupta et al.
8,357,454 B2   1/2013  Kulkarni et al.
(Continued)

FOREIGN PATENT DOCUMENTS

EP    2275645 A2    1/2011
EP    2857637 A1    4/2015
(Continued)

OTHER PUBLICATIONS

PCT Search Report and Opinion issued in connection with corresponding PCT Application No. 2020017448 dated Apr. 21, 2020, 14 pages.
(Continued)

*Primary Examiner* — Moshe Wilensky
(74) *Attorney, Agent, or Firm* — James Pemrick; Hoffman Warnick LLC

(57) ABSTRACT

A method of controlling an extent of a thermal barrier coating (TBC) sheet spall and a hot gas path (HGP) component are disclosed. The method provides an HGP component having a body with an exterior surface. Controlling the extent of the TBC sheet spall includes forming a TBC over a selected portion of the exterior surface of the body. The TBC includes a plurality of segments in a cellular pattern. Each segment is defined by one or more slots in the
(Continued)

TBC, and each segment has a predefined area such that the extent of the TBC sheet spall is limited by the predefined area of each of the plurality of segments that constitute the TBC sheet spall.

18 Claims, 13 Drawing Sheets

(51) Int. Cl.
  *B05D 3/00* (2006.01)
  *C23C 4/02* (2006.01)
  *C23C 4/18* (2006.01)
(52) U.S. Cl.
  CPC ............ *C23C 4/18* (2013.01); *F05D 2230/10* (2013.01); *F05D 2230/13* (2013.01); *F05D 2230/90* (2013.01)
(58) Field of Classification Search
  CPC ........... F05D 2230/234; F05D 2230/31; F05D 2230/12; F05D 2230/14; F05D 2230/13; F05D 2230/90; F05D 2250/22; F05D 2250/23; F05D 2250/221; F05D 2250/11; F05D 2250/132; F05D 2250/131; F05D 2250/13; F05D 2250/294; F05D 2250/28; F05D 2250/282; C23C 4/02; C23C 4/18; C23C 4/11; C23C 4/073; C23C 4/00; B33Y 10/00
  See application file for complete search history.

(56) References Cited

U.S. PATENT DOCUMENTS

| | | |
|---|---|---|
| 2005/0266163 A1 | 12/2005 | Wortman et al. |
| 2018/0066527 A1 | 3/2018 | Kadau et al. |
| 2018/0135450 A1* | 5/2018 | Propheter-Hinckley ..................... F01D 5/187 |
| 2018/0371923 A1 | 12/2018 | Johnson et al. |

FOREIGN PATENT DOCUMENTS

| | | |
|---|---|---|
| WO | 2016133579 A1 | 8/2016 |
| WO | 2020167635 A1 | 8/2020 |

OTHER PUBLICATIONS

International Preliminary Report on Patentability issued in connection with corresponding PCT Application No. 2020017448 dated Oct. 22, 2020, 19 pages.

Written Opinion and Search Report issued in connection with corresponding PCT Application No. 2020017448 dated Apr. 21, 2020, 11 pages.

PCT Request issued in connection with corresponding PCT Application No. 2020017448 dated Feb. 10, 2020, 2 pages.

* cited by examiner

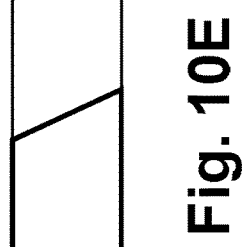
Fig. 10A
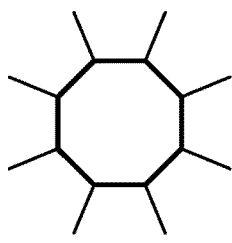
Fig. 10B
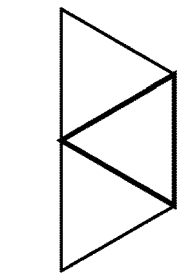
Fig. 10C
Fig. 10D
Fig. 10E
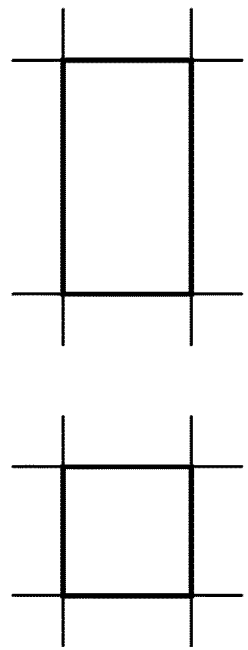
Fig. 10F
Fig. 10G
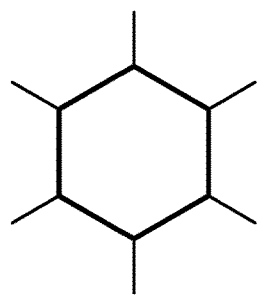
Fig. 10H
Fig. 10I

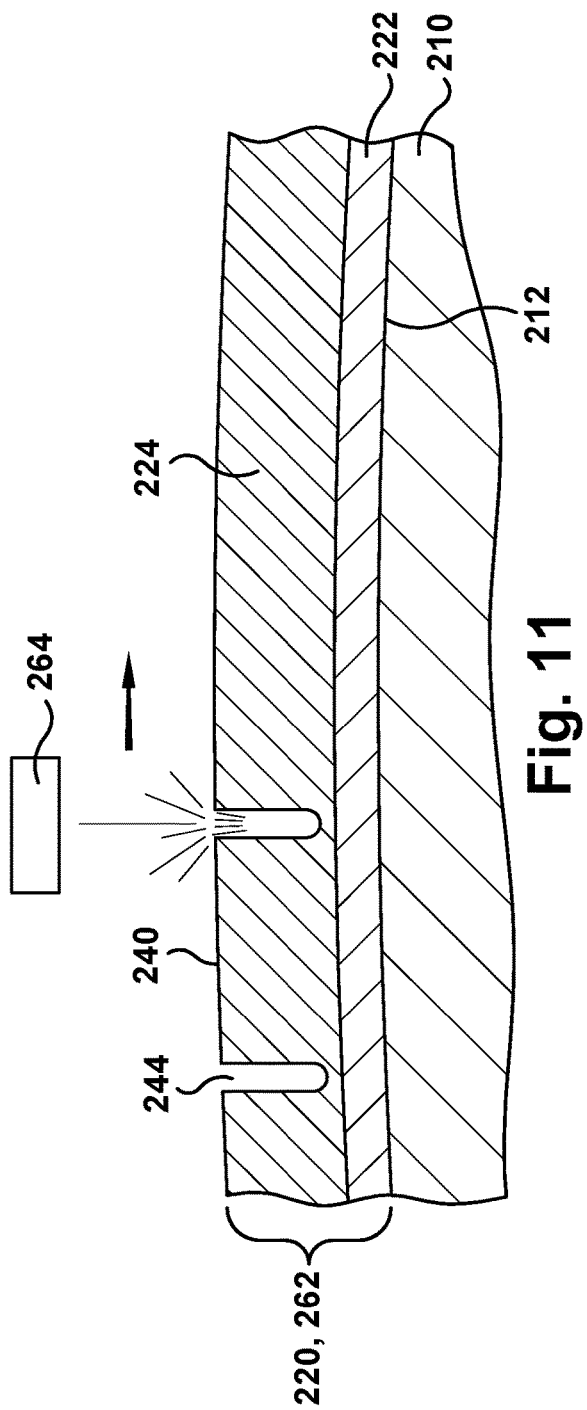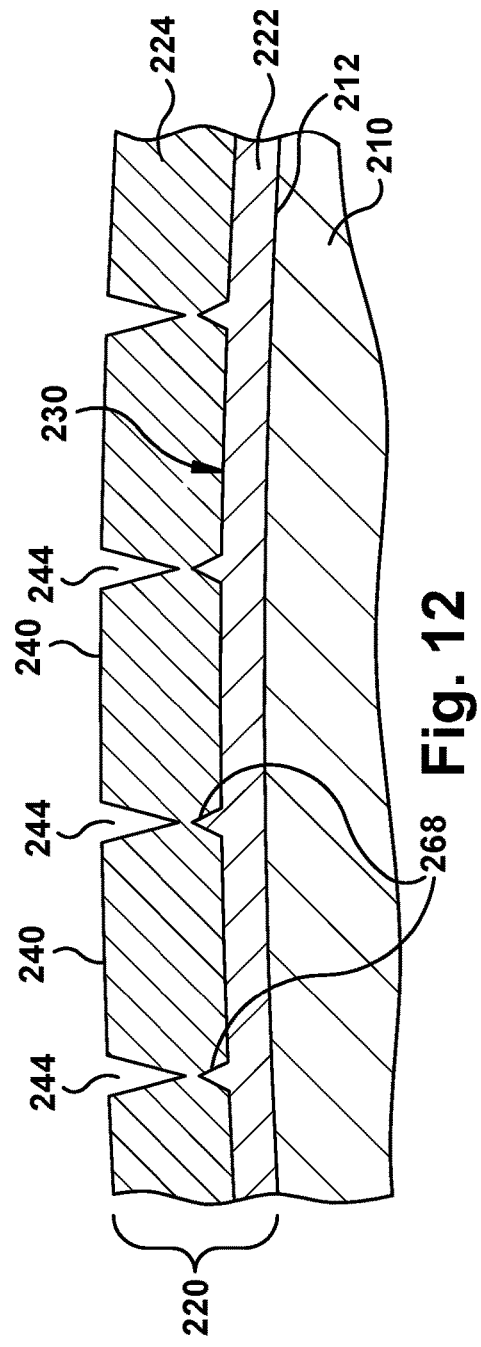

CONTROLLING EXTENT OF TBC SHEET SPALL

BACKGROUND OF THE INVENTION

The disclosure relates generally to turbomachines, and more particularly, to a hot gas path (HGP) component and method for controlling an extent of a thermal barrier coating (TBC) sheet spall.

Turbomachines such as gas turbine systems are used to power a wide variety of equipment. High efficiency gas turbine systems require firing temperatures in excess of 1500° C. The higher the temperature, the more efficient the gas turbine system. Currently, nickel or cobalt based superalloys are used to make hot gas path (HGP) components that are exposed to the hot gas path.

Thermal barrier coatings (TBC) are applied over HGP components that are exposed to the hot gases to protect the underlying metal from high temperatures and/or decrease temperature changes to which the underlying metal is exposed. TBCs are configured to adhere to the underlying metal and withstand the various thermal cycling within the gas turbine system. Spalls can occur for thermal, mechanical (e.g., impact) and/or chemical reasons during operation. In particular, the thermal cycling can create stresses within the TBC that can result in spalling. A spall may include any change in TBC creating a thermal path to an exterior surface of an HGP component for a working fluid which was not previously present. In order to address the stress-induced spalling, TBCs are formed with sub-micron sized cracks therein to allow for thermal expansion without extensive spalling. Such cracking can be formed, for example, by electron beam physical vapor deposition (EB-PVD) of yttria-stabilized zirconia (YSZ), or dense vertically cracking (DVC) TBC. The micro-cracking provides improved stress tolerance. Nonetheless, spalls can still occur. A TBC sheet spall may include displacement or detachment of a portion of the TBC creating a larger thermal path to the exterior surface than a smaller, crack-type spall. The larger the TBC sheet spall, the more damage that can occur to the underlying HGP component.

BRIEF DESCRIPTION OF THE INVENTION

A first aspect of the disclosure provides a hot gas path (HGP) component, comprising: a body having an exterior surface; and a thermal barrier coating (TBC) system including a TBC layer over a selected portion of the exterior surface of the body, the TBC layer including a plurality of segments in a cellular pattern within the selected section the exterior surface of the body, wherein each segment is defined by one or more slots extending at least partially into the TBC layer and has a predefined area such that a TBC sheet spall of the TBC system is limited by the predefined area of each of the plurality of segments that constitute the TBC sheet spall.

A second aspect of the disclosure provides a method of controlling an extent of a thermal barrier coating (TBC) sheet spall, the method comprising: providing a hot gas path (HGP) component having a body with an exterior surface; and controlling the extent of the TBC sheet spall by forming a TBC system including a TBC layer over a selected portion of the exterior surface of the body, the TBC layer including a plurality of segments in a cellular pattern, each segment defined by one or more slots extending at least partially in the TBC layer and each segment having a predefined area such that the extent of the TBC sheet spall is limited by the predefined area of each of the plurality of segments that constitute the TBC sheet spall.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIGS. 10A-I show schematic views of a various embodiments of TBC segment shapes.

FIG. 11 shows a schematic view of forming segments in a TBC layer, according to one embodiment of the disclosure.

FIG. 12 shows a schematic view of forming segments in a TBC layer, according to another embodiment of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
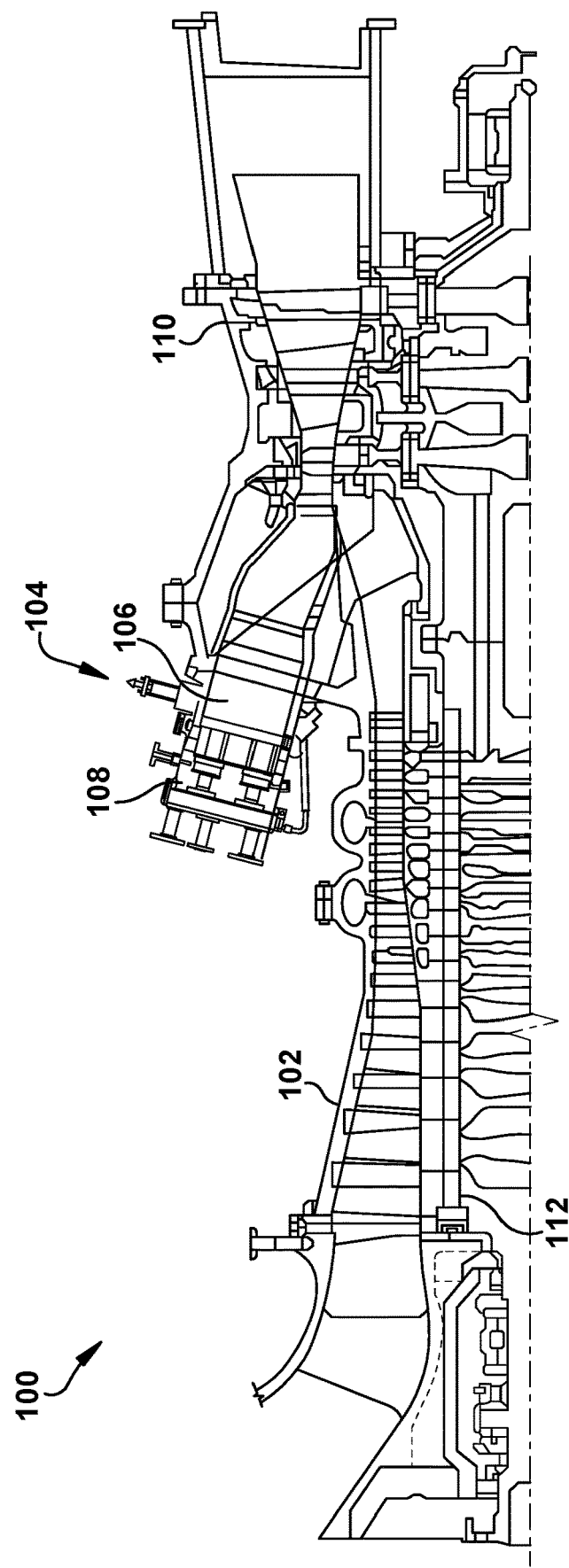
FIG. 1 shows a schematic view of an illustrative turbomachine in the form of a gas turbine system.

As an initial matter, in order to clearly describe the current disclosure it will become necessary to select certain terminology when referring to and describing relevant machine components within gas turbine system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

FIG. 1 shows a schematic illustration of an illustrative industrial machine, components of which may employ teachings of the disclosure. In the example, the machine includes a turbomachine 100 in the form of a combustion or gas turbine system. Turbomachine 100 includes a compressor 102 and a combustor 104. Combustor 104 includes a combustion region 106 and a fuel nozzle assembly 108. Turbomachine 100 also includes a turbine 110 and a common compressor/turbine shaft 112 (sometimes referred to as a rotor 112). In one embodiment, the combustion turbine system is a MS7001FB engine, sometimes referred to as a 7FB engine, commercially available from General Electric Company, Greenville, S.C. The present disclosure is not limited to any one particular industrial machine, nor is it limited to any particular gas turbine system and may be implanted in connection with other engines including, for example, the MS7001FA (7FA), the MS9001FA (9FA), the 7HA and the 9HA engine models of General Electric Company. Furthermore, the present disclosure is not limited to any particular turbomachine, and may be applicable to, for example, steam turbines, jet engines, compressors, turbofans, etc.

In operation, air flows through compressor 102 and compressed air is supplied to combustor 104. Specifically, the compressed air is supplied to fuel nozzle assembly 108 that is integral to combustor 104. Assembly 108 is in flow communication with combustion region 106. Fuel nozzle assembly 108 is also in flow communication with a fuel source (not shown in FIG. 1) and channels fuel and air to combustion region 106. Combustor 104 ignites and combusts fuel. Combustor 104 is in flow communication with turbine assembly 110 for which gas stream thermal energy is converted to mechanical rotational energy. Turbine assembly 110 includes a turbine 111 (FIG. 2) that rotatably couples to and drives rotor 112. Compressor 102 also is rotatably coupled to rotor 112. In the illustrative embodiment, there is a plurality of combustors 106 and fuel nozzle assemblies 108.

Figure 2:
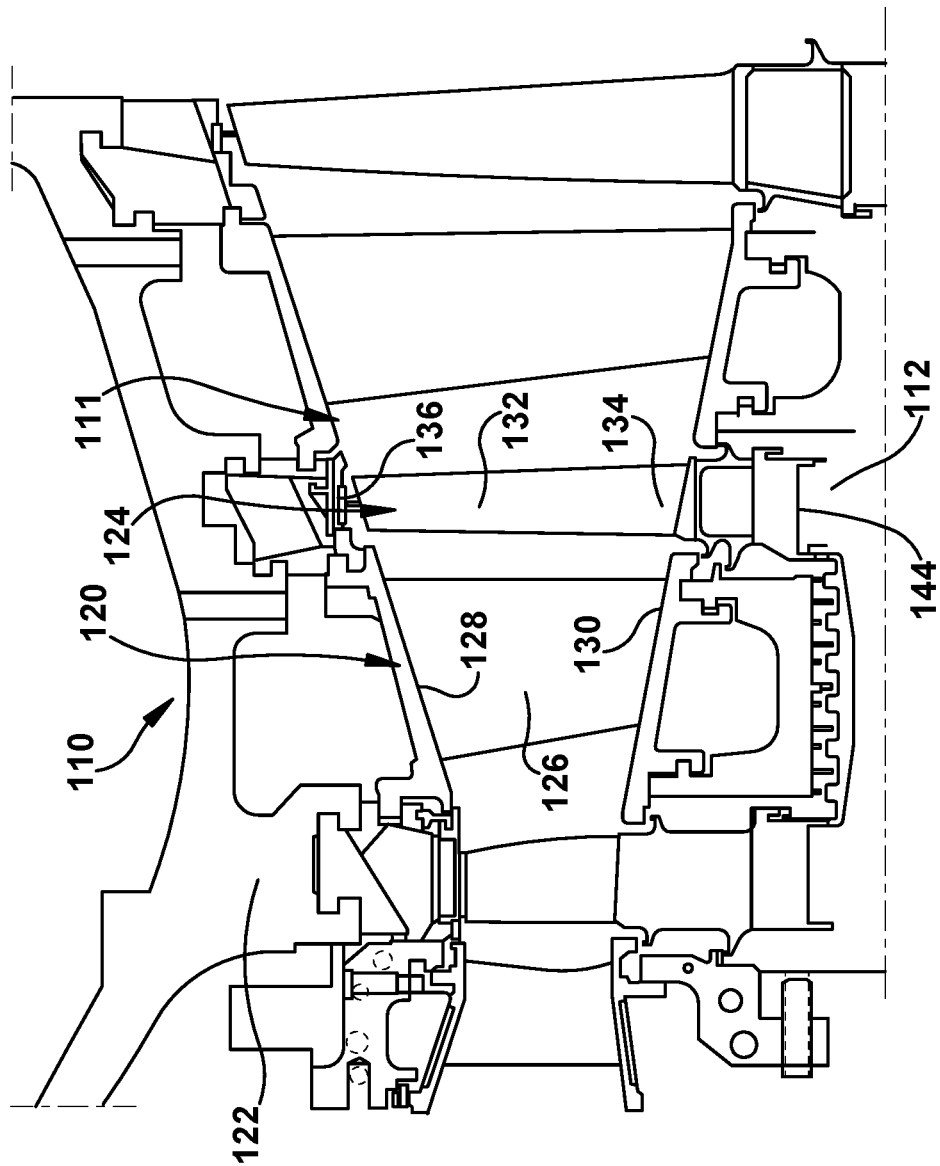
FIG. 2 shows a cross-sectional view of an illustrative gas turbine assembly that may be used with the gas turbine system in FIG. 1.

FIG. 2 shows a cross-sectional view of an illustrative turbine assembly 110 of turbomachine 100 (FIG. 1). Turbine 111 of turbine assembly 110 includes a row of nozzle or vanes 120 coupled to a stationary casing 122 of turbomachine 100 and axially adjacent a row of rotating blades 124. A nozzle or vane 126 may be held in turbine assembly 110 by a radially outer platform 128 and a radially inner platform 130. Row of blades 124 in turbine assembly 110 includes rotating blades 132 coupled to rotor 112 and rotating with the rotor. Rotating blades 132 may include a radially inward platform 134 (at root of blade) coupled to rotor 112 and a radially outward tip shroud 136 (at tip of blade). As used herein, the term "blade" or "hot gas path component" shall refer collectively to stationary vanes or blades 126 and rotating blades 132, unless otherwise stated.

Figure 3:
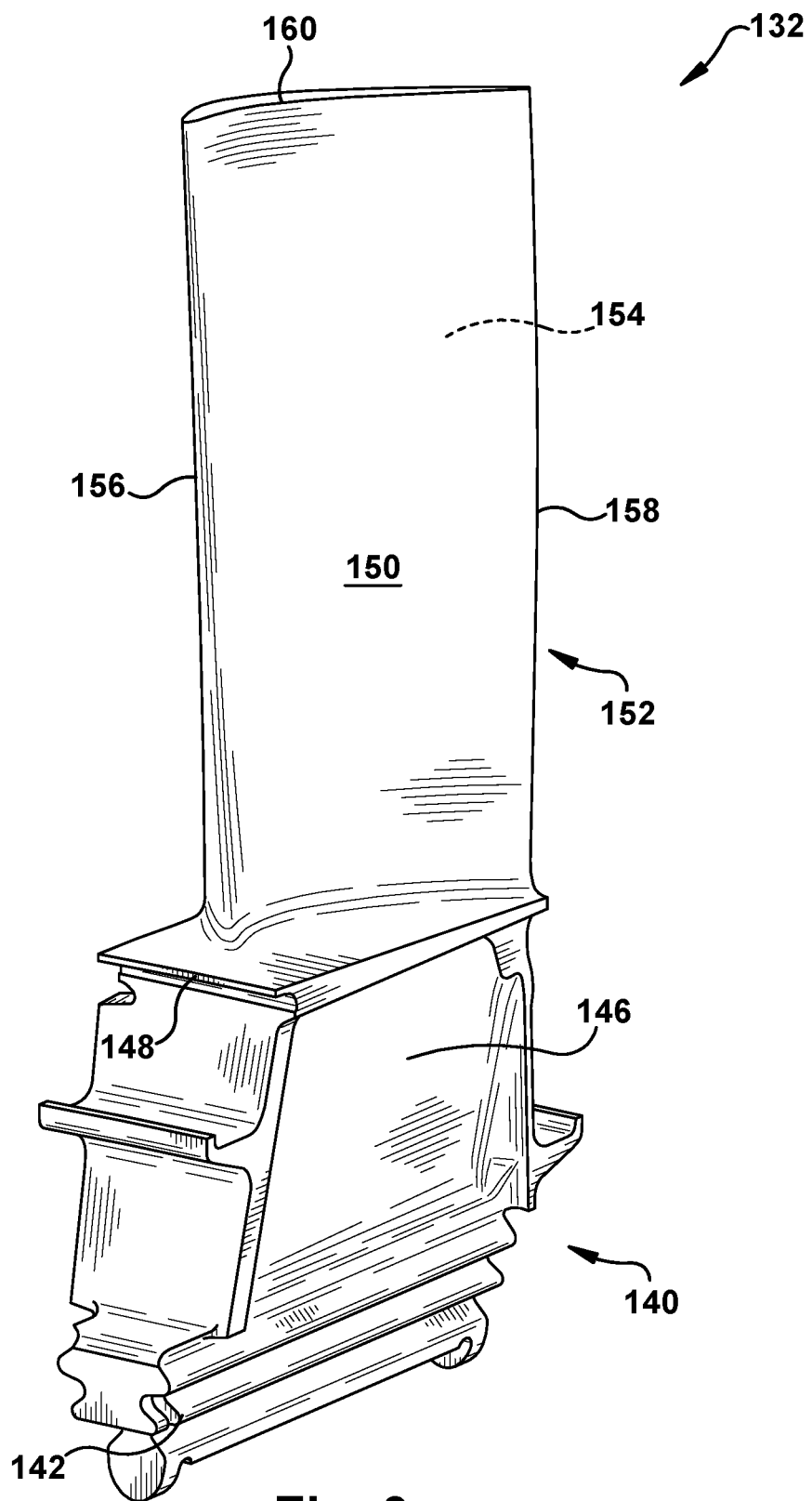
FIG. 3 shows a perspective view of an illustrative HGP component in the form of a turbine rotor blade upon which embodiments of the present disclosure may be employed.
Figure 4:
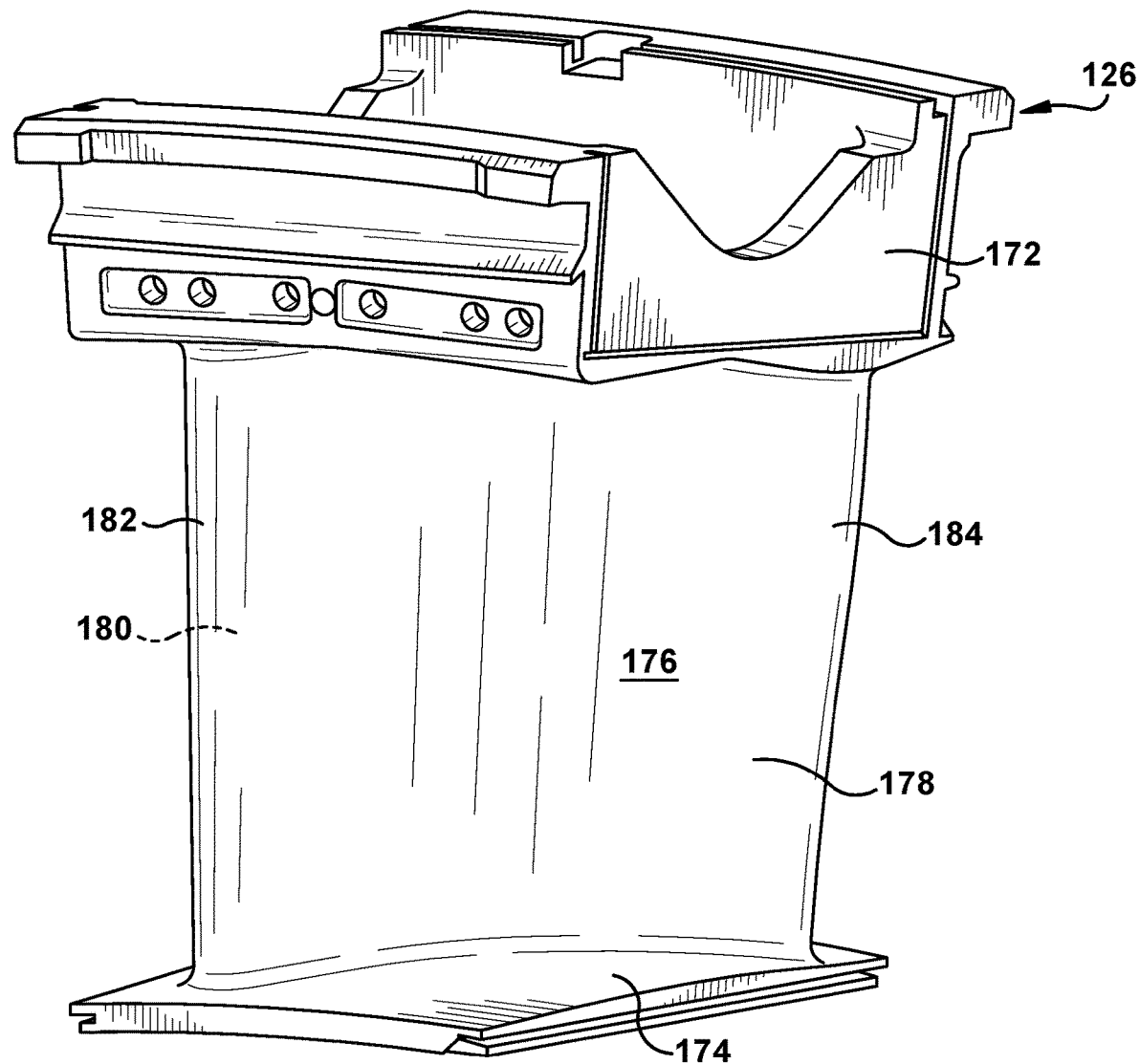
FIG. 4 shows a perspective view of an illustrative HGP component in the form of a turbine nozzle upon which embodiments of the present disclosure may be employed.

FIGS. 3 and 4 show illustrative hot gas path (HGP) components of a turbomachine in which teachings of the disclosure may be employed. FIG. 3 shows a perspective view of a turbine rotor blade 132 of the type in which embodiments of the present disclosure may be employed. Turbine rotor blade 132 includes a root 140 by which rotor blade 132 attaches to rotor 112 (FIG. 2). Root 140 may include a dovetail 142 configured for mounting in a corresponding dovetail slot in the perimeter of a rotor wheel 144 (FIG. 2) of rotor 112 (FIG. 2). Root 140 may further include a shank 146 that extends between dovetail 142 and a platform 148, which is disposed at the junction of airfoil 150 and root 140 and defines a portion of the inboard boundary of the flow path through turbine assembly 110. It will be appreciated that airfoil 150 is the active component of rotor blade 132 that intercepts the flow of working fluid and induces the rotor disc to rotate. It will be seen that airfoil 150 of rotor blade 132 includes a concave pressure side (PS) outer wall 152 and a circumferentially or laterally opposite convex suction side (SS) outer wall 154 extending axially between opposite leading and trailing edges 156, 158 respectively. Sidewalls 156 and 158 also extend in the radial direction from platform 148 to an outboard tip 160.

FIG. 4 shows a perspective view of a stationary vane or nozzle 126 of the type in which embodiments of the present disclosure may be employed. Nozzle 126 includes an outer platform 172 by which nozzle 126 attaches to stationary casing 122 (FIG. 2) of the turbomachine. Outer platform 172 may include any now known or later developed mounting configuration for mounting in a corresponding mount in the casing. Nozzle 126 may further include an inner platform 174 for positioning between adjacent turbine rotor blades 132 (FIG. 3) platforms 148 (FIG. 3). Platform 172, 174 define respective portions of the outboard and inboard boundary of the flow path through turbine assembly 110. It will be appreciated that airfoil 176 is the active component of nozzle 126 that intercepts the flow of working fluid and directs it towards turbine rotor blades 132 (FIG. 3). It will be seen that airfoil 176 of nozzle 126 includes a concave pressure side (PS) outer wall 178 and a circumferentially or laterally opposite convex suction side (SS) outer wall 180 extending axially between opposite leading and trailing edges 182, 184 respectively. Sidewalls 178 and 180 also extend in the radial direction from platform 172 to platform 174.

Embodiments of the disclosure described herein may include aspects applicable to either turbine rotor blade 132 and/or nozzle 126. It is understood that other features of blade 132 or nozzle 126, not described herein such as but not limited to: internal cooling structures, cutout shape, outer wall angling/shape, etc., may be customized for the particular application, i.e., rotor blade or vane. Further, while embodiments of the disclosure are described relative to HGP components in the form of blade 132 and/or nozzle 126, the teachings can be applied to any HGP component within an industrial machine.

Figure 5:
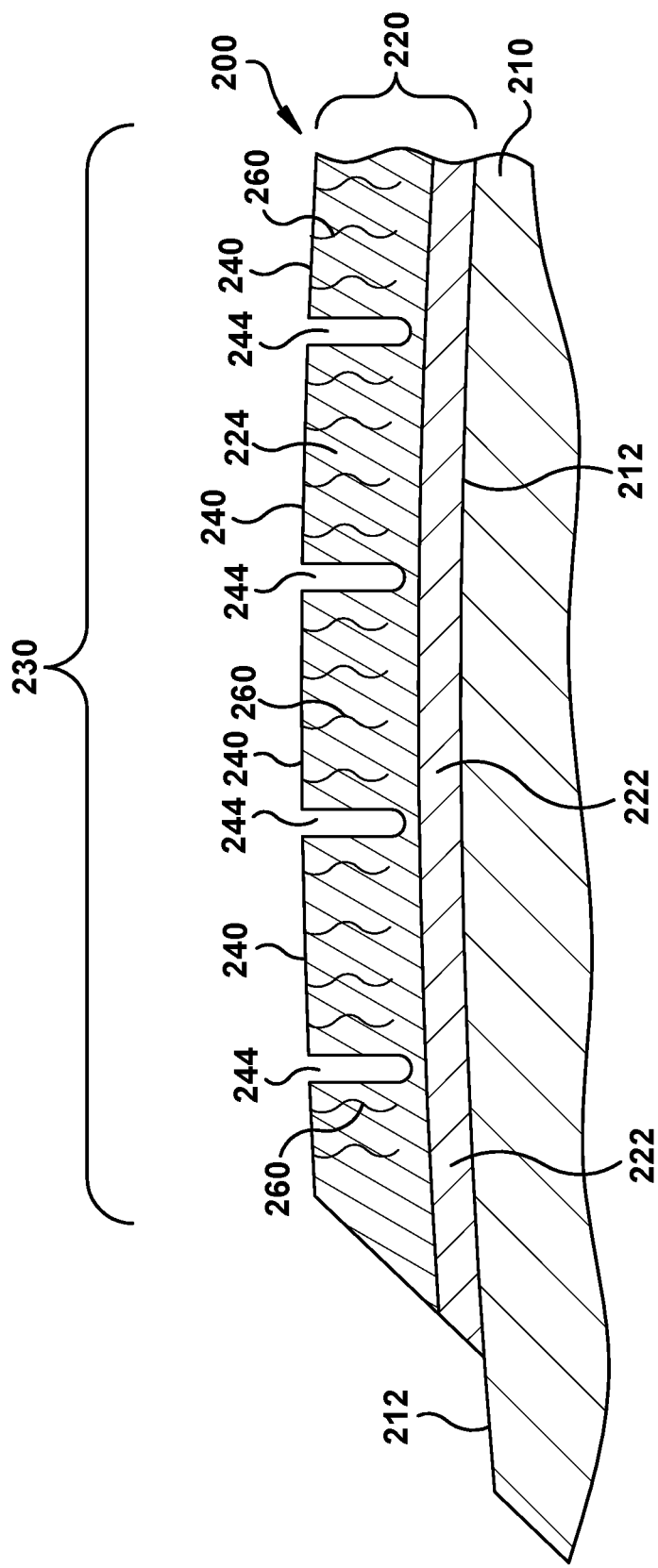
FIG. 5 shows a cross-sectional view of a selected portion of an HGP component including a TBC system with a segmented TBC layer, according to embodiments of the disclosure.
Figure 6:
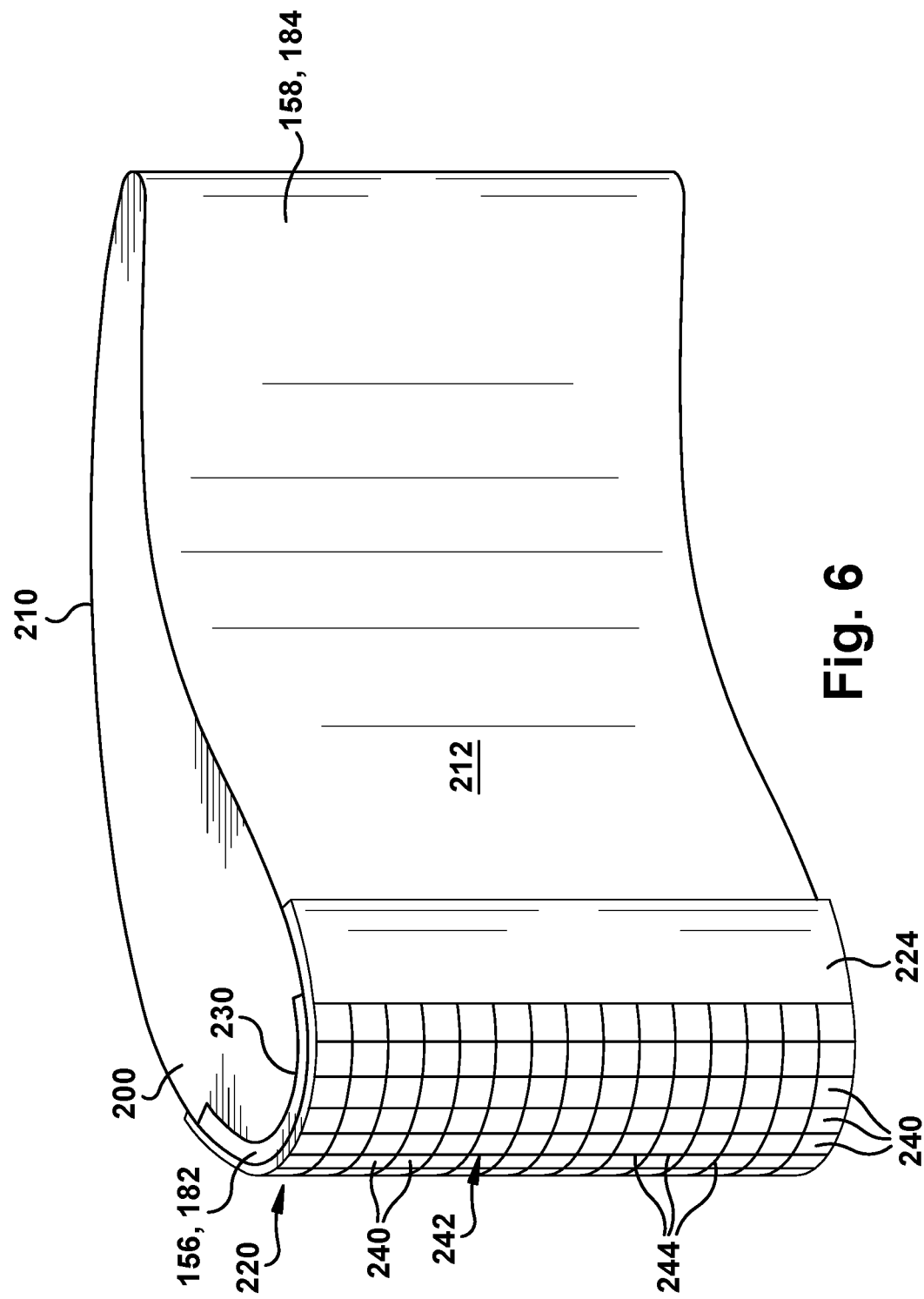
FIG. 6 shows a perspective view of a selected portion of an HGP component including a segmented TBC, according to embodiments of the disclosure.

As noted, embodiments of the disclosure control an extent of a thermal barrier coating (TBC) sheet spall. FIG. 5 shows a cross-sectional view of an illustrative HGP component 200 (e.g., blade 132 (FIG. 3), nozzle 126 (FIG. 4)) including a TBC system 220, and FIG. 6 shows a perspective view of an illustrative portion of HGP component 200 including TBC system 220, according to embodiments of the disclosure. HGP component 200 may include a body 210 having an exterior surface 212. Body 210 may be made of any now known or later developed material configured to withstand a hot gas path, such as but not limited to: metal, metal alloy, superalloy, etc. HGP component 200 may also include a thermal barrier coating (TBC) system 220 over a selected portion 230 of exterior surface 212 thereof. As shown in FIG. 5, TBC system 220 may include a bond coat layer 222, where necessary, and one or more TBC layers 224. FIG. 5 shows one TBC layer 224. Bond coat layer 222 may include any now known or later developed bond coat material such as but not limited to: nickel or platinum aluminides, or MCrAlY (chromium aluminum yttrium) where M can be nickel, cobalt and/or iron, and perhaps including silicon or hafnium. TBC layer(s) 224 may include any now known or later developed TBC material such as but not limited to: partially stabilized yttria zirconia (YSZ)(e.g., 8YSZ), fully stabilized yttria zirconia of 20 or greater Y (e.g., 20YSZ) or an ultralow dielectric constant material (ULK), e.g., mullite and alumina. TBC system 220 may include additional layers also such as a thermally grown oxide.

As shown in FIG. 5 and the perspective view of FIG. 6, in contrast to conventional TBC systems, TBC system 220 includes a plurality of segments 240 in a cellular pattern 242 within selected section 230. Each segment 240 is defined by one or more slots 244 in TBC system 220 and has a predefined area, e.g., square millimeters. As will be described in greater detail, cellular pattern 242 and slots 244 are configured such that an extent of a TBC sheet spall of TBC system 220, e.g., a detachment thereof, is limited by the predefined area of each of segments 240 that constitute the TBC sheet spall.

Slots 244 that create segments 240 are to be contrasted to a plurality of conventional stress relief cracks 260 in TBC system 220, as shown in FIG. 5. Stress relief cracks 260 can be formed in TBC layer(s) 224 in any now known or later developed fashion. Stress relief cracks 260 can be formed, for example, as part of a dense vertical cracking (DVC) process. In this case, for example, 1 million relief cracks 260 per square millimeter, maybe provided. In contrast, slots 244 may have a width ranging from 50 to 500 micrometers. Further, the predefined area of each segment 240 defined between slots 244 may be based on a TBC sheet spall size limitation for the HGP component 200. For example, a certain HGP component 200 may have a maximum allowable TBC sheet spall of a diameter of approximately 3.2 millimeters to 6.4 mm. Hence, each segment 240 may have an approximately 5.0 mm$^2$ to 10 mm$^2$ area for that HGP component 200. The predefined area may be customized for each HGP component 200. Further, each HGP component 200 may have more than one selected portion 230 such that a predefined area of respective segments 240 for each portion may be customized. Slots 244 may have any depth necessary to ensure desired detachment as a TBC sheet spall, e.g., 40%-100% of the thickness of TBC layer(s) 224. In one embodiment, slots 244 may only extend partially through TBC layer 224, but in other embodiments slots 244 may extend through TBC layer 124 to reach bond coat layer 222.

Figure 7:
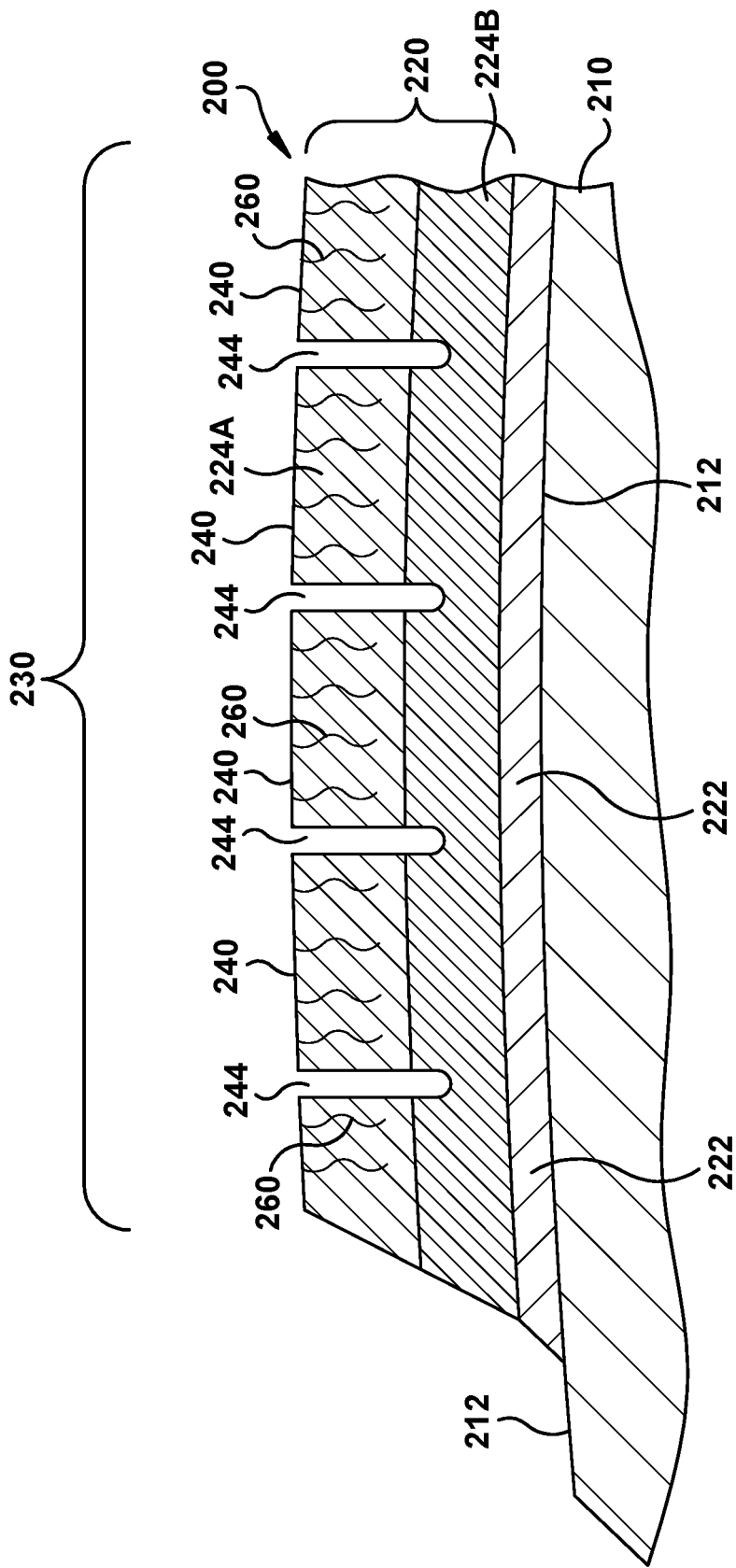
FIG. 7 shows a cross-sectional view of a selected portion of an HGP system including a TBC system with a segmented TBC layer among two TBC layers.
Figure 8:
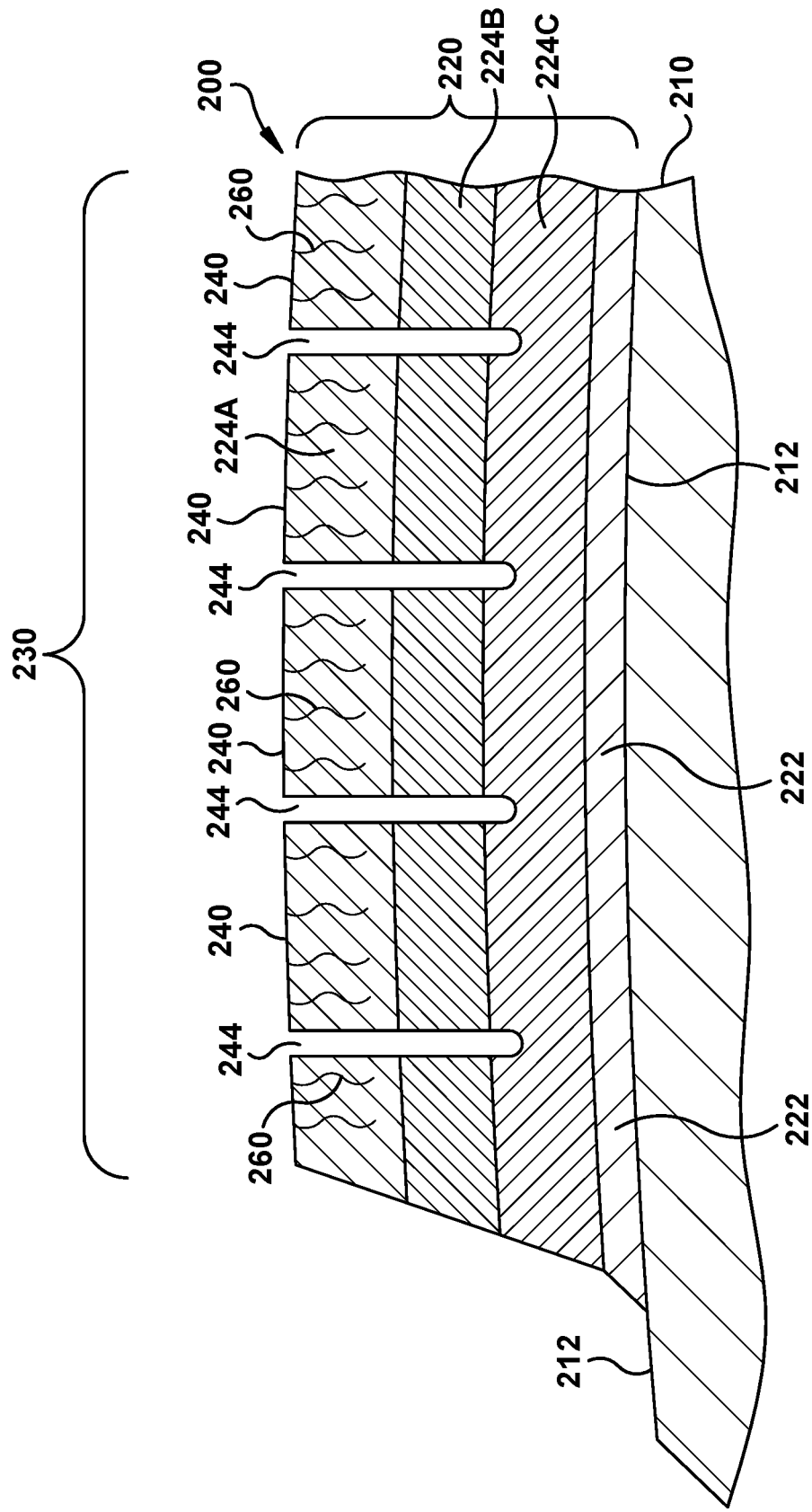
FIG. 8 shows a cross-sectional view of a selected portion of an HGP system including a TBC system with a segmented TBC layer among three TBC layers.

FIGS. 7 and 8 show TBC systems 200 with more than one TBC layer 224. FIG. 7 shows two TBC layers 224A, 224B, and FIG. 8 shows three TBC layers 224A, 224B, 224C. As shown in FIGS. 7 and 8, where more than one TBC layer 224 is provided, slots 244 may extend into each TBC layer 224. For example, where two TBC layers 224 are employed, slots 244 may extend only partially through an outermost TBC layer 224 (as in FIG. 5), or as shown in FIG. 7, slots 244 may extend through outermost TBC layer 224A and partially through innermost TBC layer 224B. In another example, shown in FIG. 8, where three TBC layers 224 are employed, slots 244 may extend only partially through an outermost TBC layer 224 (as in FIG. 5), or slots 244 may extend through outermost TBC layer 224A, partially through intermediate TBC layer 224B, and not into innermost TBC layer 224C, or as shown in FIG. 8, slots 244 may extend through outermost TBC layer 224A, intermediate TBC layer 224B and partially through innermost TBC layer 224C. In any event, slots 244 can extend to a certain percentage of the total thickness of TBC layers 224A, B, and/or C, e.g., a percentage of a total thickness of one, two or three TBC layers 224. In any event, depth of slots 244 may be a function of the overall thickness of TBC layer(s) 224 and/or the location of selected portion(s) 230.

Figure 9:
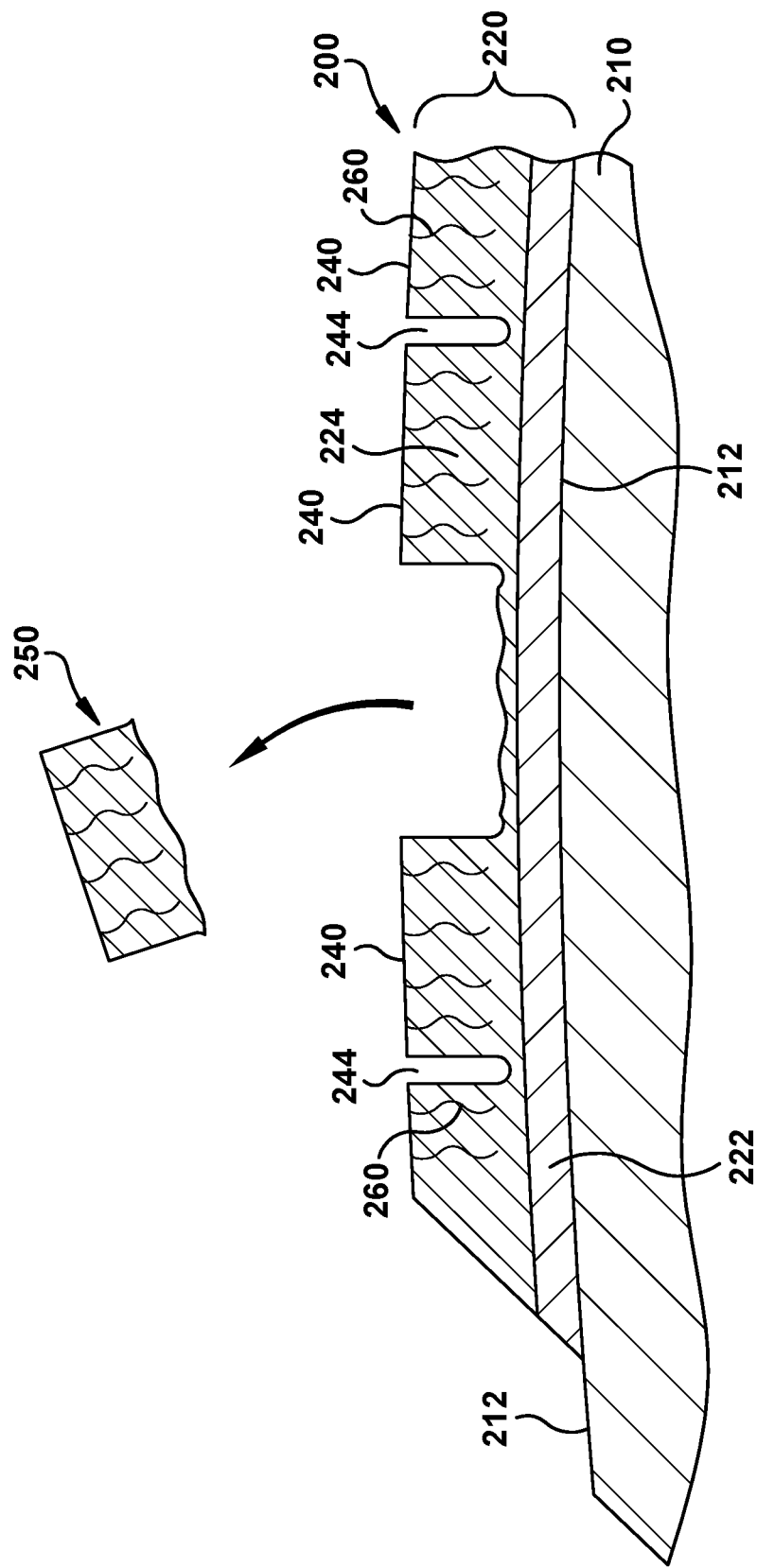
FIG. 9 shows a cross-sectional view of a selected portion of an HGP component experiencing a TBC sheet spall, according to embodiments of the disclosure.

A method according to embodiments of the disclosure, as shown mainly in FIGS. 5 and 6, includes providing HGP component 200 having body 210 with exterior surface 212 with TBC system 220 thereon. FIG. 9 shows a cross-sectional view of an illustrative HGP component 200 experiencing a controlled TBC sheet spall 250, according to embodiments of the disclosure. Controlling an extent of TBC sheet spall 250 (FIG. 9) includes forming TBC system 220 over selected portion 230 of exterior surface 212 of body 210, including segments 240 in cellular pattern 242. As noted, each segment 240 is defined by one or more slots 244 in TBC layer(s) 224 and has a predefined area such that the extent of TBC sheet spall 250 is limited by the predefined area of each of segments 240 that constitute the TBC sheet spall. While TBS sheet spall 250 is shown including one segment 240, it is understood that other segments 240 may also detach as part of TBC sheet spall 250 or as part of another TBC sheet spall. As shown in FIG. 9, cellular pattern 242 and slots 244 are configured such that an extent of a TBC sheet spall 250 of TBC system 220, e.g., a detachment thereof, is limited by the predefined area of each segment(s) 240 that constitute TBC sheet spall 250. In contrast, without segments 240 of cellular pattern 242, TBC sheet spall 250 would include any area of TBC system 220 capable of being pulled away, e.g., TBC system 220 (bond coat layer 222 and TBC layer 224) from exterior surface 212 and/or TBC layer 224 from bond coat layer 222. In this case, even an initially small portion of TBC system 220 that spalls can create a very larger area TBC sheet spall. Segmentation as provided according to embodiments of the disclosure limits the extent of any TBC sheet spall 250 to the predefined area of segment(s) 240 that may detach, and thus limits the extent of damage that can occur to HGP component 200 when a TBC sheet spall occurs.

While selected portion 230 has been illustrated as on a leading edge 156, 182 of an airfoil of HGP component 200 (FIGS. 8-9), it is emphasized that it can be provided anywhere and only where necessary on HGP component. That is, cellular pattern 242 need only be provided in TBC system 220 where TBC sheet spallation is a concern. In this regard, the method may include determining selected portion 230 based on an expected spall occurring at the selected portion, e.g., through use of modeling and/or empirical data of known temperature gradients, previous spallation, materials used, etc. Selected portion 230 need not include all of TBC system 220; it can include any aerial portion of TBC system 220.

Each segment 240 may also have a predefined shape. In FIG. 6, cellular pattern 242 is arranged with slots 244 in a generally perpendicular, grid pattern, i.e., with some variation for HGP component exterior surface 212 curvature. Here, segments 240 are square or rectangular. However, segments 240 can have any desired shape to aid in controlling the extent of TBC sheet spall 250. FIGS. 10A-I show a number of examples including but not limited to: square (FIG. 10A), rectangular (FIG. 10B), triangular (FIG. 10C), octagonal (FIG. 10D), trapezoidal (FIG. 10E), polygonal (FIG. 10F), elongated diamond (FIG. 10G), diamond (FIG. 10H), and hexagonal (FIG. 10I). FIG. 10I could, for example, be provided in a honeycomb cellular pattern.

TBC system 220 with segments 240 in cellular pattern 242 can be formed in a number of ways. In one embodiment, shown in the schematic view of FIG. 11, TBC forming may include forming TBC as a layer 262, i.e., as TBC layer 224 perhaps with bond coat layer 222. Segments 240 in layer 262 may then be created by creating slots 244 in layer 262. Slots 244 may be created in a number of ways. For example, slots 244 may be created using at least one of: a laser, an electric discharge machine, an ultrasonic etcher, and/or a water jet. Generically, these slot forming tools are indicated as tool 264 in FIG. 11.

Figure 13:
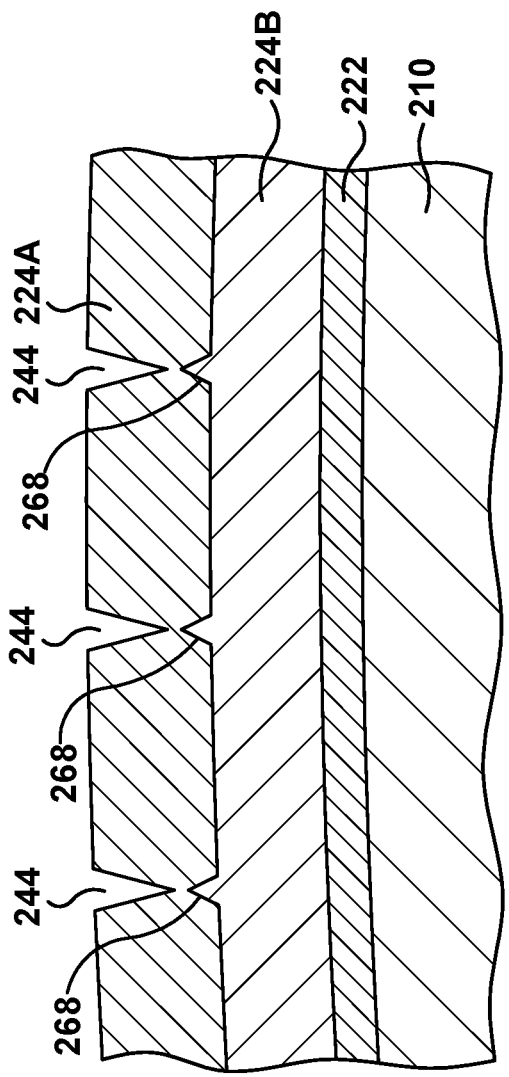
FIG. 13 shows a schematic view of forming segments in a TBC layer, according to another embodiment of the disclosure.

FIGS. 12 and 13 show schematic views of another manner for creating slots 244. In the FIG. 12 embodiment, bond coat layer 222 is present between TBC layer 224 and selected portion 230 of exterior surface 212 of body 210. Here, bond coat layer 222 may be formed with a plurality of segment creating features 268 that are configured to create plurality of segments 240 in TBC layer 224, e.g., by creating slots 244. Segment creating features 268 may include any physical feature capable of creating slots 244 in TBC layer 224, e.g., segment creating features act as stress risers that create slots 244 via a tensile or compressive stress. In the example shown, segment creating features 268 are shown as peaked or knife-edge features, but they may have a variety of other shapes. In another embodiment, shown in FIG. 13, where TBC system 220 includes more than one TBC layer 224A, B, segment creating features 268 can be located at an interface between TBC layers 224A, 224B. For example, one could form a non-outermost TBC layer 224B with a plurality of segment creating features 268 configured to create the one or more slots 244 in an outermost TBC layer 224A. In this embodiment, segment creating features 268 may be used to control slot 244 location and also control the maximum depth of the TBC spall. Segment creating features 268 could remain with inner TBC layer 224B if a TBC spall were to occur.

Figure 14:
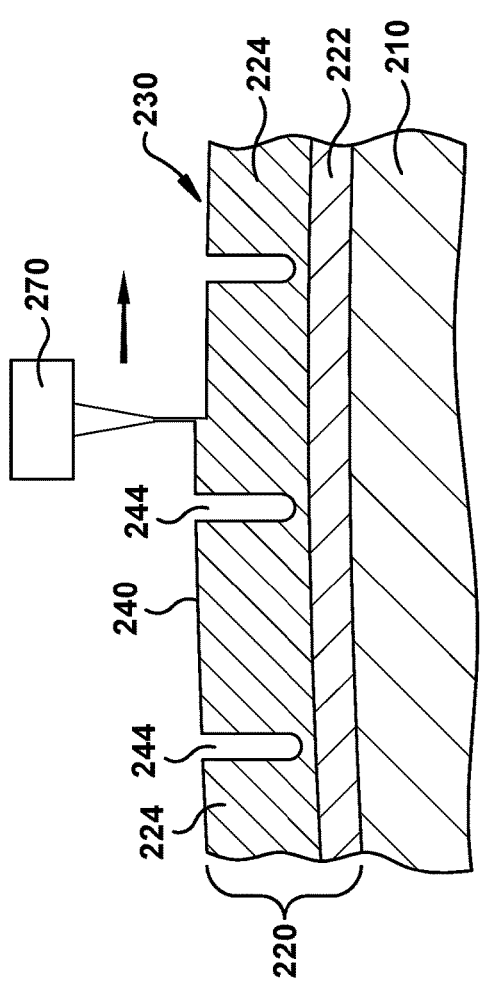
FIG. 14 shows a schematic view of forming segments in a TBC layer using additive manufacturing, according to embodiments of the disclosure.

FIG. 14 shows a schematic view of another embodiment for forming TBC system 220 with plurality of segments 240 therein, i.e., with slots 244 in at least TBC layer 224. In this embodiment, TBC system 220 may be formed using any additively manufacturing process appropriate for TBC system 220. As understood in the art, additive manufacturing (AM) includes a wide variety of processes of producing a component through the successive layering of material rather than the removal of material. For example, additive manufacture can be carried out using an AM tool 270, e.g., photolithography, laser, binder jet, plastic jet, etc., to form TBC system 220. Additive manufacturing can create complex geometries without the use of any sort of tools, molds or fixtures, and with little or no waste material.

Figure 16:
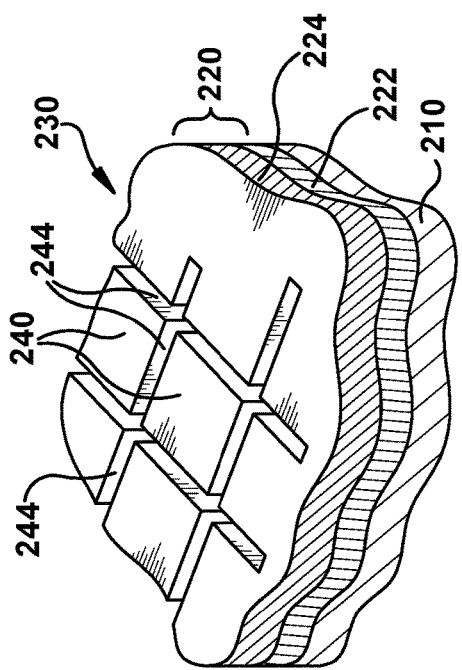
FIG. 16 shows a perspective view of forming segments in a TBC layer using the segment-forming mesh of FIG. 15, according to embodiments of the disclosure.
Figure 15:
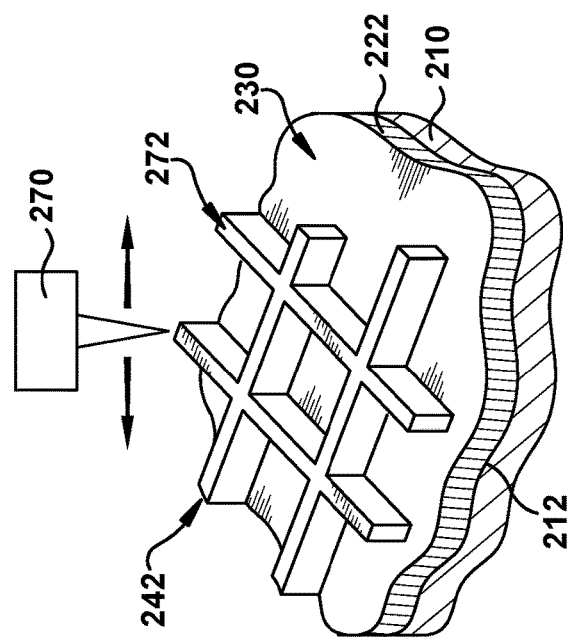
FIG. 15 shows a perspective view of forming a segment-forming mesh, according to embodiments of the disclosure.

FIGS. 15 and 16 show perspective views of another embodiment of forming TBC segments 240. In this embodiment, a segment-forming mesh 272 is formed over selected portion 230 of exterior 212 surface of body 210 of the HGP component. Segment-forming mesh 272 includes cellular pattern 242 for plurality of segments 240. That is, segment-forming mesh 272 has the configuration of where slots 244 are to be present in TBC system 220. Segment-forming mesh 272 can be formed in a number of ways such as additively manufacturing segment-forming mesh 272 over selected portion 230 of exterior surface 212 of body 210 of the HGP component. Alternatively, segment-forming mesh 272 can be printed elsewhere or otherwise formed, and then applied to selected portion 230 of exterior surface 212 of body 210 of the HGP component. In any event, as shown in FIG. 16, overcoating segment-forming mesh 272 with TBC system 220, e.g., TBC layer 224, creates plurality of segments 240. As shown in FIG. 16, removing segment-forming mesh 272 (FIG. 15) creates slots 244 (FIGS. 5 and 6). Segment-forming mesh 272 can be removed in a number of ways. In one embodiment, segment-forming mesh 272 can be made of a dissolvable material such as but not limited to a water soluble ceramic or a water soluble plastic. In this case, segment-forming mesh 272 can be removed after overcoating using a water flush, resulting in the segmented TBC (FIGS. 5 and 6). Alternatively, segment-forming mesh 272 can be made of other material capable of removal via a leachant or an etching process, e.g., certain water soluble ceramics or silica cores dissolvable with caustic solutions. In another embodiment, segment-forming mesh 272 removal may occur during use of HGP component 200. That is, segment-forming mesh 272 can be left in HGP component 200, and removed as the component is used in, for example, gas turbine system 100. In this case, removal can occur by, for example, oxidation. While FIGS. 14-16 show a single TBC layer, it is understood that any number of TBC layers may be used.

Regardless of how formed, TBC system 220 formation with segments 240 in cellular pattern 242 can be provided during initial manufacture of HGP component 200, or during repair thereof after a time of use.

Embodiments of the disclosure can be applied to control the extent of TBC sheet spall 250 (FIG. 9) regardless of the type of TBC employed. Segmented TBC system 220 can be applied to any form of selected portion 230 where damage is highly likely to occur. That is, segmented TBC system 220 does not have to be applied to all areas of HGP component 200. As described, segmented TBC system 220 can be formed by a variety of additive and/or subtractive processes.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A hot gas path (HGP) component, comprising:
a body having an exterior surface; and
a thermal barrier coating (TBC) system including a TBC layer over a selected portion of the exterior surface of the body, the TBC layer including a plurality of segments in a cellular pattern within the selected section the exterior surface of the body, wherein each segment is demarcated by slots extending at least partially into the TBC layer and has a predefined area such that a TBC sheet spall of the TBC system is limited by the predefined area of each of the plurality of segments that constitute the TBC sheet spall, wherein the TBC system includes a bond coat layer between the TBC layer and the selected portion of the exterior surface of the body, wherein the bond coat layer includes a plurality of segment creating features including knife edge features configured to create the slots via at least one of a tensile or compressive stress in the TBC layer.

2. The HGP component of claim 1, further comprising a plurality of stress relief cracks in the TBC layer.

3. The HGP component of claim 1, wherein the predefined area is based on a TBC sheet spall size limitation for the HGP component.

4. The HGP component of claim 1, wherein each slot has a width ranging from 50 to 500 micrometers.

5. The HGP component of claim 1, wherein the TBC layer includes a plurality of TBC layers, and wherein the slots extend at least partially through the plurality of TBC layers.

6. A method of controlling an extent of a thermal barrier coating (TBC) sheet spall, the method comprising:
providing a hot gas path (HGP) component having a body with an exterior surface; and
controlling the extent of the TBC sheet spall in a TBC system including a TBC layer over a selected portion of the exterior surface of the body, the TBC layer including a plurality of segments in a cellular pattern and a plurality of segment creating features including knife edge features,
creating a plurality of slots in the thermal barrier coating:
each segment is demarcated by the plurality of slots extending at least partially in the TBC layer and each segment having a predefined area such that the extent of the TBC sheet spall is limited by the predefined area of each of the plurality of segments that constitute the TBC sheet spall.

7. The method of claim 6, wherein the TBC system includes a plurality of stress relief cracks in the TBC layer.

8. The method of claim 6, wherein the predefined area is based on a predefined TBC sheet spall size limitation for the HGP component.

9. The method of claim 6, wherein each segment has a predefined shape.

10. The method of claim 6, wherein the TBC system includes forming the TBC layer, and then forming the plurality of segments in the TBC layer by creating the plurality of slots in the TBC layer.

11. The method of claim 10, wherein the creating the plurality of slots in the TBC layer includes using at least one of: a laser, an electric discharge machine, an ultrasonic etcher, and a water jet.

12. The method of claim 6, wherein the TBC system includes additively manufacturing the TBC layer with the plurality of segments therein.

13. The method of claim 6, wherein the TBC system includes:
- a segment-forming mesh over the selected portion of the exterior surface of the body of the HGP component, the segment-forming mesh including the cellular pattern for the plurality of segments; the method further includes:
- overcoating the segment-forming mesh with the TBC layer, creating the plurality of segments; and
- removing the segment-forming mesh, creating the plurality of slots.

14. The method of claim 13, wherein the removing the segment-forming mesh occurs during use of the HGP component.

15. The method of claim 13, wherein the segment-forming mesh includes additively manufacturing the segment-forming mesh over the selected portion of the exterior surface of the body of the HGP component.

16. The method of claim 6, wherein the TBC system includes a bond coat layer between the TBC layer and the selected portion of the exterior surface of the body, and wherein the plurality of segment creating features are formed on the bond coat layer.

17. The method of claim 6, wherein the TBC system includes a plurality of TBC layers, and wherein the plurality of slots extend at least partially through the plurality of TBC layers.

18. The method of claim 17, wherein the plurality of segments includes a non-outermost TBC layer with a plurality of segment creating features configured to create the plurality of slots in an outermost TBC layer.

* * * * *